UNITED STATES PATENT OFFICE.

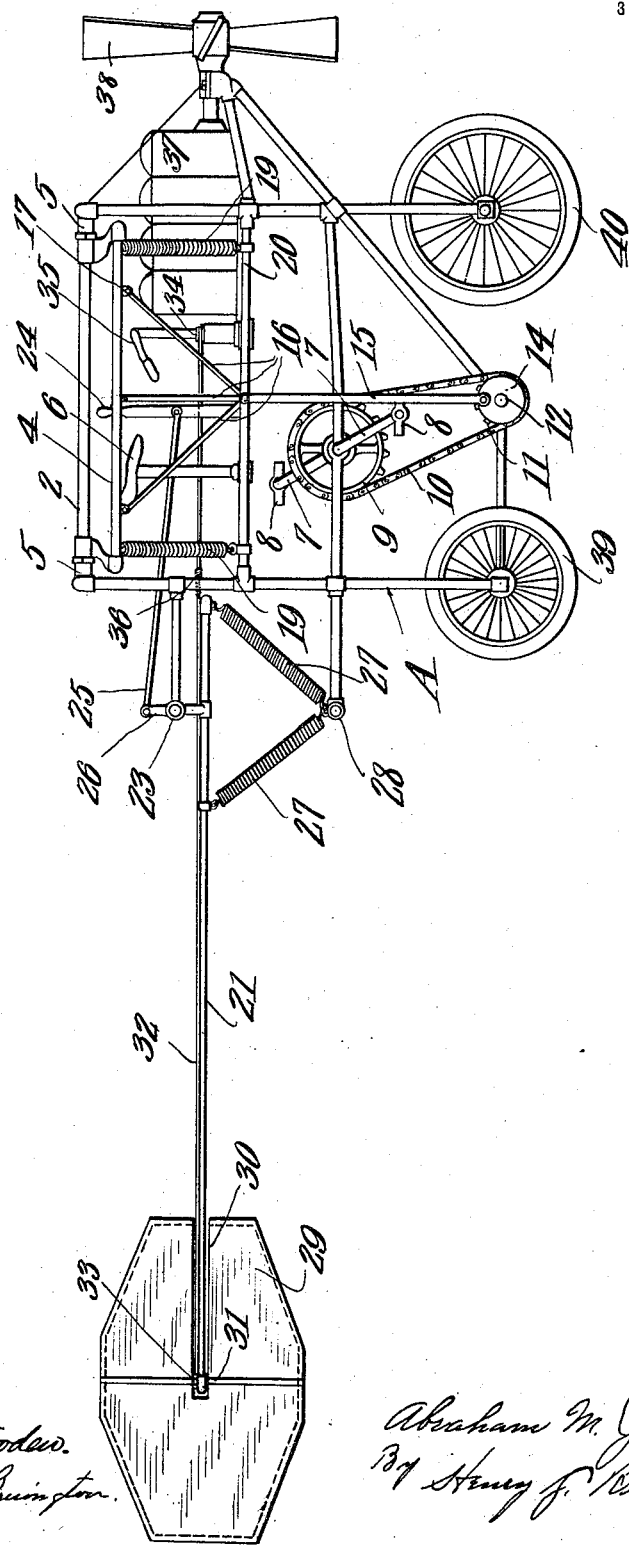

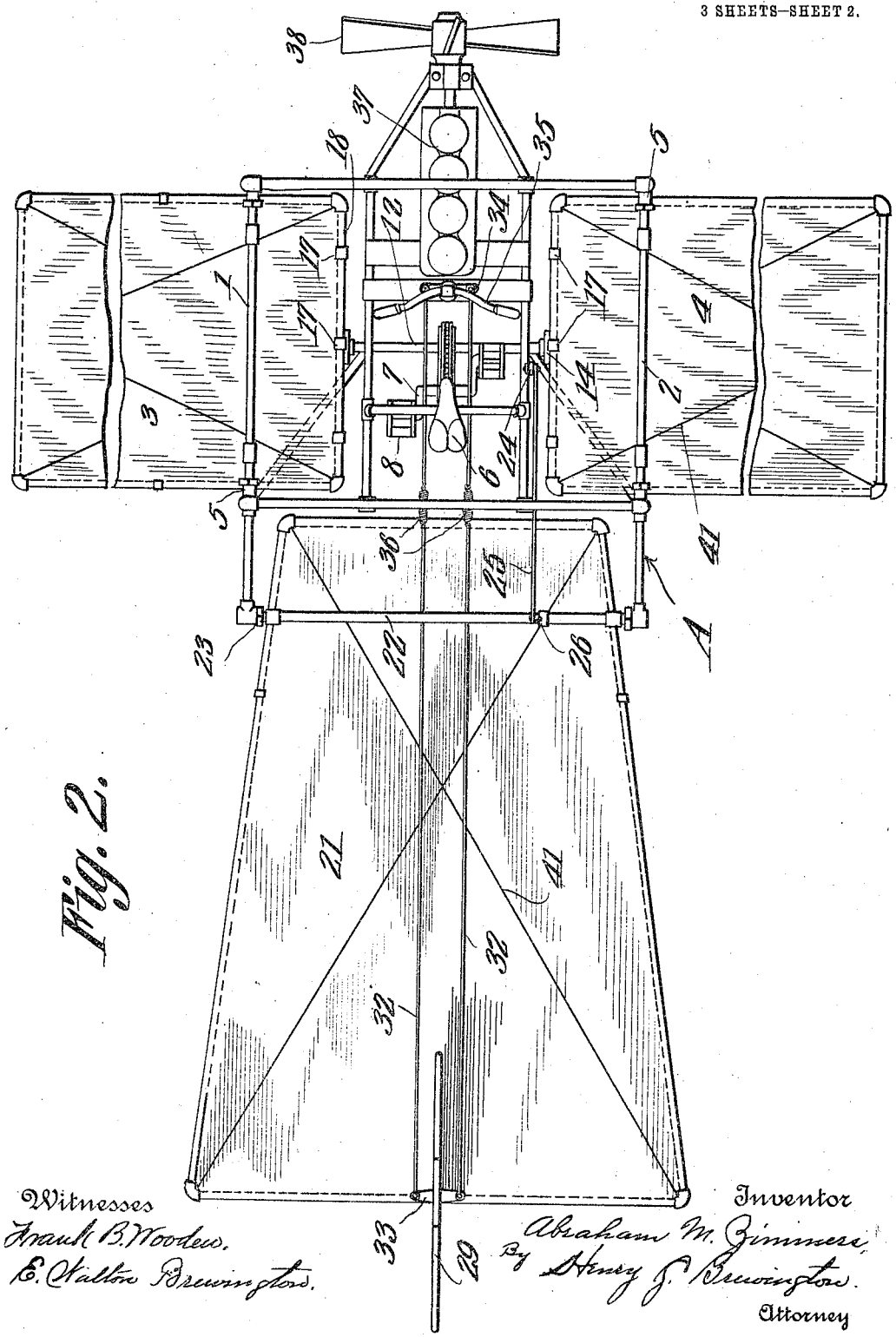

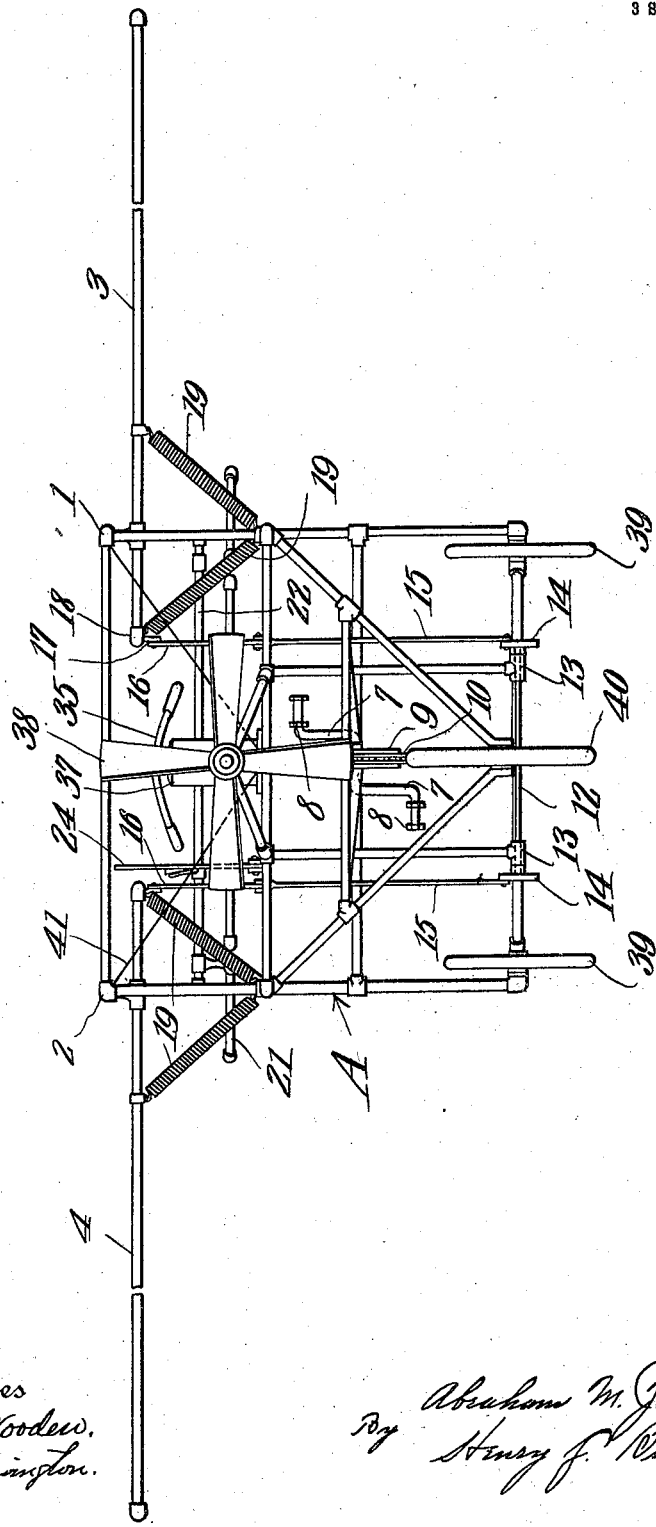

ABRAHAM M. ZIMMERS, OF BALTIMORE, MARYLAND.

FLYING-MACHINE.

1,001,185.   Specification of Letters Patent.   Patented Aug. 22, 1911.

Application filed February 1, 1911. Serial No. 605,887.

*To all whom it may concern:*

Be it known that I, ABRAHAM M. ZIMMERS, a citizen of the United States, residing at Baltimore city, State of Maryland, have invented certain new and useful Improvements in Flying-Machines, of which the following is a specification.

My invention relates to an improvement in flying machines, and has for its object to provide a machine of this character in which the wings or planes are constructed in such a manner that when the machine is struck suddenly by a gust of wind, the shock which would otherwise be occasioned thereby is absorbed by the wings or planes in such a manner as to prevent the machine from careening or turning over, as might otherwise be the case without the employment of the features of my invention, the further object of the invention being to facilitate the ascent in the flight of the machine, as well as the control of the machine by the operator under the circumstances of being suddenly struck by a gust of wind as hereinbefore mentioned.

With the foregoing objects in view, my invention consists in certain novel features of construction and combinations of parts which will be hereinafter described and pointed out in the claims.

Reference being had to the accompanying drawings, in which like numerals are used to designate the same parts throughout the several views, Figure 1 is a side elevation of the aeroplane or flying machine; Fig. 2 is a plan view of the same, parts being broken away, and Fig. 3 is a front elevation of the same.

A, indicates generally the frame of the aeroplane, which is preferably made of light metal tubing. Longitudinal pieces 1 and 2 of a rectangular frame at the top of the machine serve as trunnions for the side wings or planes 3 and 4, said trunnions having bearings 5 of any desirable form at their ends on the frame A, of the machine. A seat 6 for the operator is positioned between the wings 3 and 4, and directly beneath the seat is provided a pair of cranks 7, the ends terminating in pedals 8, for manipulation by the operator of a sprocket wheel 9 fixed to the crank shaft, a chain 10 being trained over said sprocket, and then over a small sprocket 11, said sprocket 11 being fixed to a shaft 12, which has bearings 13 on the frame.

To each end of the shaft 12 is secured a crank wheel 14; a connecting link 15 is secured at one end to the crank pin of the cranks 14, and at the other end is secured to a plurality of links 16, which are secured by swivel connections 17, to the inner end frame piece 18 of the wings 3 and 4. Secured at one end to the side pieces of the wings or planes 3 and 4 are angularly disposed tension springs 19, the other ends of which are secured to a longitudinal extending frame piece 20, directly beneath the shafts 1 and 2, said springs tending at all times to maintain a relatively horizontal position of the wings.

Projecting from the rear of the frame A, is a tail piece 21, which serves the purpose of directing the angle of flight in a vertical direction, and is securely mounted on a transverse shaft 22, said shaft oscillating in bearings 23, on the frame A. The said tail plane is operated by means of a lever 24, within easy reach of the operator; a rod 25 connecting said lever with an arm 26, secured to the shaft 22, so that when it is the desire of the aviator to ascend or descend, the lever is properly manipulated, and the plane tilted against the action of angularly disposed tension springs 27, one end of which springs is secured to the frame of the plane 21, and the other end secured to a cross bar 28 of the frame A.

Pivotally mounted on the rear of the tail piece 21, is a rudder 29, provided with a slot 30, which embraces the tail plane and permits of a swinging of the rudder on its axis 31, said movement being effected by means of rods 32, connected at one end to a cross arm 33, which is secured to the rudder, and the other end of the rod 32 connected to a similar cross arm or lever 34, secured to the stem of a handle bar 35, located in front of the operator's seat. A coil spring 36 is interposed in the rod 32, at a point near the inner end of the plane 21, to compensate for the change in length of the said rod when the plane 21 is tilted in either direction.

On the front of the frame A, and forward of the operator's seat is located an internal combustion engine 37 of any approved type to the shaft of which is connected a propeller 38. To the rear of the frame A, are rotatably secured a pair of wheels 39, suitably supported by the frame and braced therefrom, and to the front is a single wheel 40, likewise braced, said wheels providing a truck for the machine while on the ground. It is to be understood that suitable bracings such as shown at 41 may be employed throughout the frame and planes, for the purpose of strengthening same.

Slight changes and alterations might be resorted to in the form and arrangement of the several parts described, without departing from the spirit and scope of my invention, and hence I do not wish to limit myself to the exact construction as herein set forth; but, Having fully described my invention, what I claim as new and desire to secure by Letters Patent, is:

1. A machine of the character described, comprising a frame, laterally extending side and rear planes pivoted intermediate their ends to said frame, means for positively raising and lowering said planes, and springs for returning said planes to normal position, said springs connecting each plane at each side of its pivot to said frame.

2. A machine of the character described, comprising a frame, laterally extending side and rear planes pivoted intermediate their ends to said frame, separate means for positively raising and lowering said side and rear planes, and springs for returning said planes to normal position, said springs connecting each plane at each side of its pivot to said frame.

In testimony whereof I affix my signature in presence of two witnesses.

ABRAHAM M. ZIMMERS.

Witnesses:
E. WALTON BREWINGTON,
BROWN M. ALLEN.

---

Copies of this patent may be obtained for five cents each, by addressing the "Commissioner of Patents, Washington, D. C."